United States Patent
Noguchi et al.

(10) Patent No.: US 10,521,134 B2
(45) Date of Patent: Dec. 31, 2019

(54) MEMORY SYSTEM

(71) Applicant: KABUSHI KAISHA TOSHIBA, Tokyo (JP)

(72) Inventors: Hiroki Noguchi, Kanagawa (JP); Shinobu Fujita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 500 days.

(21) Appl. No.: 15/263,017

(22) Filed: Sep. 12, 2016

(65) Prior Publication Data

US 2017/0075601 A1  Mar. 16, 2017

(30) Foreign Application Priority Data

Sep. 16, 2015 (JP) ................................ 2015-183279

(51) Int. Cl.
*G11C 29/00* (2006.01)
*G06F 3/06* (2006.01)
*G06F 11/10* (2006.01)

(52) U.S. Cl.
CPC ............ *G06F 3/0619* (2013.01); *G06F 3/064* (2013.01); *G06F 3/0685* (2013.01); *G06F 11/1064* (2013.01)

(58) Field of Classification Search
CPC .. G06F 11/10; G06F 11/1064; G06F 11/1068; G06F 12/08; G06F 15/16; G06F 3/06; G06F 3/0605; G06F 3/0619; G06F 3/0632; G06F 3/0679
See application file for complete search history.

(56) References Cited

U.S. PATENT DOCUMENTS

| | | | | |
|---|---|---|---|---|
| 5,983,023 A * | 11/1999 | Moriwaki | ........... | G06F 15/7846 711/104 |
| 6,078,992 A * | 6/2000 | Hum | ................... | G06F 12/0846 711/120 |
| 7,752,395 B1 * | 7/2010 | Fair | ..................... | G06F 12/0866 711/133 |
| 7,882,305 B2 | 2/2011 | Moritoki | | |
| 8,006,139 B2 | 8/2011 | Okawa et al. | | |
| 9,196,334 B2 | 11/2015 | Kang et al. | | |
| 9,244,853 B2 | 1/2016 | Kang et al. | | |
| 2005/0071564 A1 * | 3/2005 | Luick | .................. | G06F 12/0806 711/121 |
| 2012/0297110 A1 * | 11/2012 | Kavi | ................... | G06F 12/0864 711/3 |

(Continued)

FOREIGN PATENT DOCUMENTS

| JP | 8-87450 | 4/1996 |
|---|---|---|
| JP | 2008-90411 | 4/2008 |

(Continued)

*Primary Examiner* — Guy J Lamarre
*Assistant Examiner* — Enamul M Kabir
(74) *Attorney, Agent, or Firm* — Finnegan, Henderson, Farabow, Garrett & Dunner, L.L.P.

(57) ABSTRACT

A memory system has a first memory which comprises a nonvolatile memory data region, and a second memory which stores data before storing in a third memory, the data not being written back on the third memory in a lower-level with access priority lower than access priority of the first memory, among data inside the nonvolatile memory data region, wherein the second memory has a bit error rate lower than a bit error rate of the first memory.

18 Claims, 4 Drawing Sheets

(56) References Cited

U.S. PATENT DOCUMENTS

| | | | |
|---|---|---|---|
| 2012/0311405 A1* | 12/2012 | Kanai | G06F 11/1064 714/763 |
| 2014/0189204 A1 | 7/2014 | Sugimoto et al. | |
| 2014/0208030 A1 | 7/2014 | Sakata et al. | |
| 2015/0205538 A1 | 7/2015 | Motegi | |
| 2016/0004241 A1 | 1/2016 | Yoshike | |
| 2016/0188429 A1 | 6/2016 | Noguchi et al. | |

FOREIGN PATENT DOCUMENTS

| | | |
|---|---|---|
| JP | 2008-276646 | 11/2008 |
| JP | 2015-52938 | 3/2015 |
| JP | 2015-135603 | 7/2015 |
| JP | 2015-519640 | 7/2015 |
| JP | 2015-528601 | 9/2015 |
| WO | WO 2007/097027 A1 | 8/2007 |
| WO | WO 2012/029137 A1 | 3/2012 |
| WO | WO 2013/042240 A1 | 3/2013 |
| WO | WO 2014/103489 A1 | 7/2014 |
| WO | WO 2014/125606 A1 | 8/2014 |
| WO | WO 2015/034087 A1 | 3/2015 |

* cited by examiner

MEMORY SYSTEM

CROSS REFERENCE TO RELATED APPLICATIONS

This application is based upon and claims the benefit of priority from the prior Japanese Patent Application No. 2015-183279, filed on Sep. 16, 2015, the entire contents of which are incorporated herein by reference.

FIELD

An embodiment of the present invention relates to a memory system.

BACKGROUND

Low power consumption is necessary for a processor used in a portable information terminal. An example of lowering the power consumption of the processor includes a method for replacing nonvolatile memories with cache memories using a static random access memory (SRAM) with large standby energy.

Examples of the nonvolatile memories include a magnetoresistive random access memory (MRAM), a ferroelectric random access memory (FeRAM), a resistance random access memory (ReRAM), and the like. Among the nonvolatile memories which have been proposed, especially, the MRAM may simultaneously satisfy the following three characteristics. That is, high rewriting resistance, operation performance capable of high-speed readout and writing, and a cell size capable of high integration.

However, the MRAM is high in a bit error rate, compared to the SRAM or DRAM.

DETAILED DESCRIPTION

According to one embodiment, a memory system has a first memory which comprises a nonvolatile memory data region, and a second memory which stores data before storing in a third memory, the data not being written back on the third memory in a lower-level with access priority lower than access priority of the first memory, among data inside the nonvolatile memory data region, wherein the second memory has a bit error rate lower than a bit error rate of the first memory.

Figure 1:
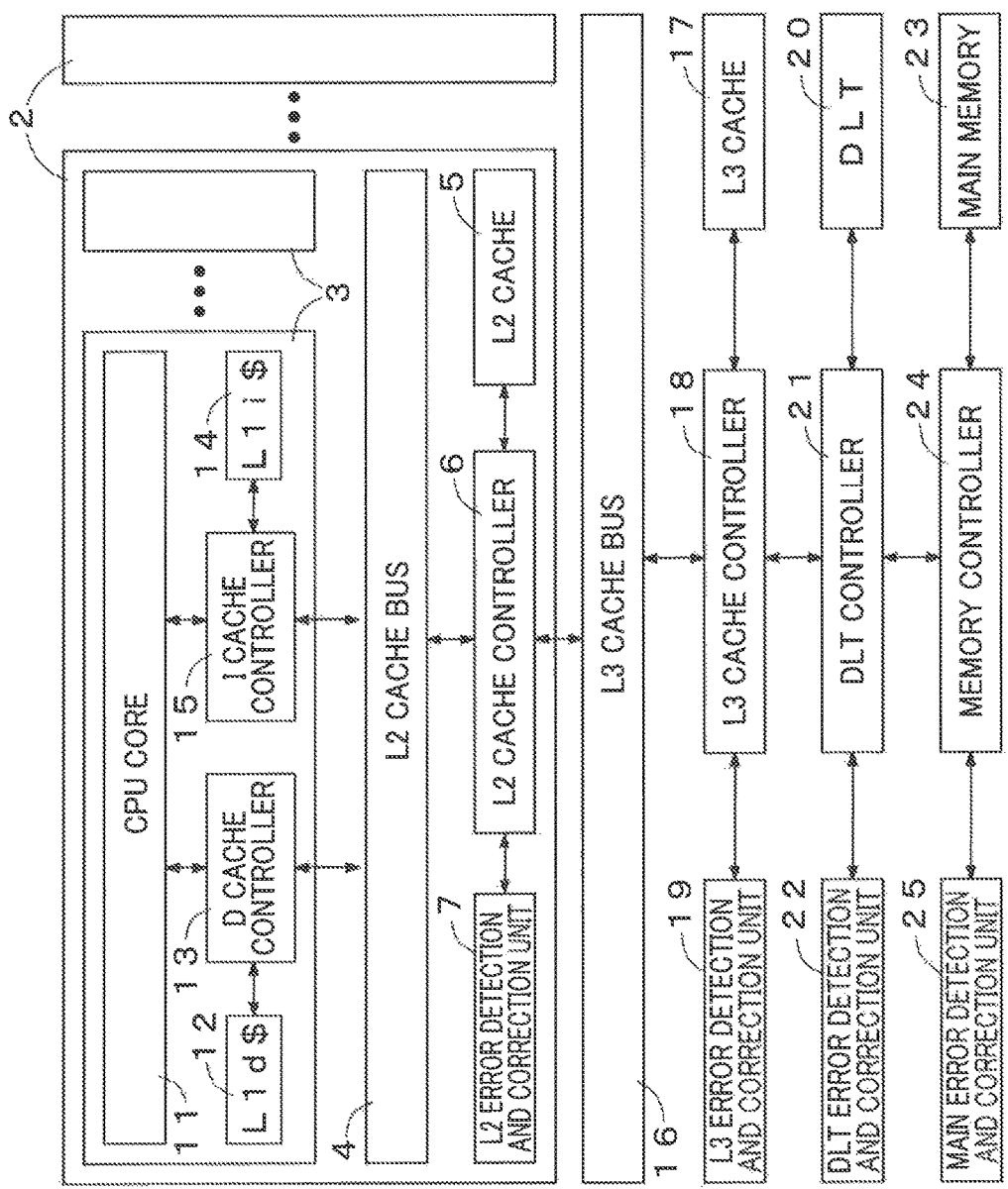
FIG. 1 is a block diagram illustrating a schematic configuration of a cache memory system according to an embodiment.

Hereinafter, an embodiment of the present invention will be described in detail. FIG. 1 is a block diagram illustrating a schematic configuration of a processor system and a memory system 1 according to an embodiment. The processor system and the memory system 1 in FIG. 1 include a plurality of sockets 2. Each socket 2 includes a plurality of core units 3, an L2 cache bus 4, an L2 cache (L2$, fourth memory) 5, an L2 cache controller 6, and an L2 error detection and correction unit 7. Any number of the sockets 2 is applicable. Similarly, any number of the core units 3 is applicable inside each socket 2. Each socket 2 can include one or a plurality of chips. The processor system includes all the constituents in the plurality of sockets 2. The memory system includes the constituents except for the plurality of core units 3 in the plurality of sockets 2.

Similarly, each core unit 3 can also include one or a plurality of chips. Note that it is not indispensable to provide the plurality of sockets 2 or the plurality of core units 3 as illustrated in FIG. 1.

The L2 cache bus 4 is connected to the plurality of core units 3. The plurality of core units 3 accesses the common L2 cache 5 through the L2 cache bus 4 and the L2 cache controller 6. Memory capacity of the L2 cache 5 is, for example, 256 KB. The L2 cache 5 includes an L2 tag unit (not illustrated) and an L2 data cache unit (not illustrated). The L2 error detection and correction unit 7 carries out error detection and error correction when reading out data written on the L2 data cache unit.

Each core unit 3 includes a CPU core 11, an L1 data cache (L1d$) 12, an L1 data cache controller (D cache controller) 13, an L1 command cache (L1i$) 14, and an I cache controller 15. Memory capacity of the L1 data cache 12 and the L1 command cache 14 may be any number, for example, 32 KB.

In addition, the memory system 1 in FIG. 1 includes an L3 cache bus 16, an L3 cache (L3$, first memory) 17, an L3 cache controller 18, an L3 error detection and correction unit (error correction unit) 19, a dirty line table (DLT: second memory) 20, a DLT controller 21, a DLT error detection and correction unit 22, a main memory (third memory) 23, a memory controller 24, and a main error detection and correction unit 25. The L3 cache bus 16 is connected to the plurality of sockets 2. The DLT error detection and correction unit 22 is not necessarily an essential element, since the DLT 20 itself includes a memory with a low error rate. In a case of three basic cache levels, the DLT 20 is mounted between the L3 cache 17 and the main memory 23. However, in a case of two basic cache levels, the DLT 20 may be mounted between the L2 cache 5 and the main memory 23.

Each socket 2 accesses the common L3 cache 17 through the L3 cache bus 16 and the L3 cache controller 18. Memory capacity of the L3 cache 17 is, for example, 32 MB.

The L3 cache 17 includes an L3 tag unit (not illustrated) and an L3 data cache unit (not illustrated). The L3 data cache unit is a nonvolatile memory data region including a nonvolatile memory such as an STT-MRAM and the like. The L3 tag unit is a memory having access speed faster than that of the L3 data cache unit such as the SRAM and the like. The L3 error detection and correction unit 19 carries out the error detection and the error correction when reading out data written on the L3 data cache unit.

The DLT 20 is accessed by the DLT controller 21. The DLT controller 21 is connected to the L3 cache controller 18. The DLT 20 can be regarded as a cache memory in a level between the L3 cache 17 and the main memory 23 and also as a cache memory in a level equivalent to the L3 cache 17. As mentioned later, the DLT 20 partially carries out operations similar to a normal cache memory, but also carries out operations different from the normal cache memory.

Memory capacity of the DLT 20 may be much smaller than the memory capacity of the L3 cache 17, for example, 64 KB approximately. Access speed of the DLT 20 is preferably set to be faster than access speed of the L3 cache 17, but may be equivalent to or less than the access speed of the L3 cache 17.

The DLT 20 includes a DLT tag unit (not illustrated) and a DLT data cache unit (not illustrated). The DLT data cache unit includes a memory such as the SRAM and the like with a bit error rate lower than that of the L3 data cache unit. As mentioned later, note that the DLT data cache unit and the L3 data cache unit may both include the MRAM. In this case, as mentioned later, by changing usage of the MRAM or changing an access method, it is possible to lower the bit error rate of the DLT data cache unit than the bit error rate of the L3 data cache unit.

The DLT error detection and correction unit 22 carries out the error detection and the error correction when reading out data stored in the DLT data cache unit.

The main memory 23 is accessed by the memory controller 24. The memory controller 24 is connected to the DLT controller 21. The main memory 23 includes, for example, the DRAM. The main error detection and correction unit 25 carries out the error detection and the error correction when reading out data stored in the main memory 23.

Note that among the memory system 1 in FIG. 1, some configuration parts (for example, the plurality of core units 3 and the main memory 23) may be provided to other semiconductive chips or circuit substrates. In other words, the memory system 1 according to the embodiment includes, at least, the L3 cache 17, the L3 cache controller 18, the L3 error detection and correction unit 19, the DLT 20, the DLT controller 21, and the DLT error detection and correction unit 22.

FIG. 1 illustrates an example where the L3 cache controller 18 controlling the L3 cache 17, the DLT controller 21 controlling the DLT 20, and the memory controller 24 controlling the main memory 23 are provided separately. However, two or more controllers among these controllers may be combined to one controller.

Figure 2:
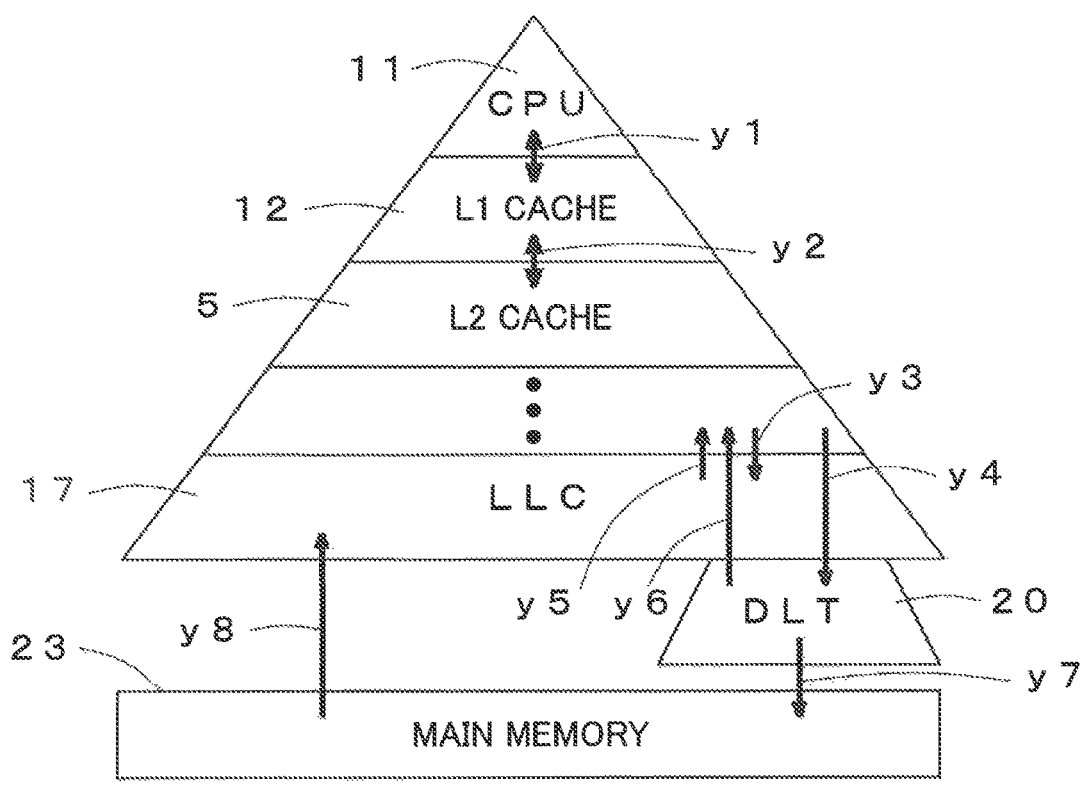
FIG. 2 is a schematic view illustrating process operations of the cache memory system of the embodiment.

FIG. 2 is a schematic view illustrating process operations of the memory system 1 of the embodiment. As illustrated in FIG. 2, the memory system 1 in FIG. 1 has a four-level memory configuration including the L1 cache 12, the L2 cache 5, the L3 cache 17, and the main memory 23. Herein, the L1 cache is in the highest-level and the main memory 23 is in the lowest-level. Furthermore, the L3 cache 17 is the lowest cache memory and is referred to as a last level cache (LLC). The lower memories have larger memory capacity and slower access speed.

Note that the LLC is not necessarily the L3 cache 17. For example, a cache memory of a higher level than the L4 cache may be the LLC. On the contrary, a cache level may be decreased to two levels so as to set the L2 cache 5 as the LLC.

As illustrated in FIG. 2, the cache memory of the embodiment is provided with the DLT 20, having the memory capacity smaller than that of the LLC, between the LLC and the main memory 23.

When storing new data in the LLC, the DLT 20 stores the data if it is dirty data. In other words, in a case where data newly stored in the LLC is yet written on the main memory 23 in a level lower than the LLC, the data will be stored in both the LLC and the DLT 20.

The reason for this process is that the DLT 20 has a bit error rate lower than that of the LLC so that even though there is an error in data readout from the LLC, it is possible to deliver correct data to the CPU by reading out the same data from the DLT 20.

If the L3 cache 17 is the LLC, the error correction can be carried out on data readout from the L3 cache 17 by the L3 error detection and correction unit 19. Therefore, the data whose error has been reliably corrected by the L3 error detection and correction unit 19 may be delivered to the CPU as it is.

Arrowed lines in FIG. 2 illustrate transmission and reception of data among the L1 cache 12, the L2 cache 5, the LLC 17, and the main memory 23. Data transmission and reception between the CPU 11 and the L1 cache 12 (arrowed line y1) and the data transmission and reception between the L1 cache 12 and the L2 cache 5 (arrowed line y2) are equivalent to the cache memory in the related art.

Among the data written on the LLC (L3 cache 17) (arrowed line y3), dirty data is also written on the DLT 20 (arrowed line y4). Among the data readout from the LLC (L3 cache 17) (arrowed line y5), data on which the error correction cannot be carried out by the L3 error detection and correction unit 19 will be read out from the DLT 20 (arrowed line y6).

The data written on the DLT 20 is written back on the main memory 23 at a predetermined timing (arrowed line y7). The predetermined timing is when new data is written on the DLT 20 or when a power source of the DLT 20 is turned off.

Data readout from the main memory 23 will not be written on the DLT 20 but on the LLC (L3 cache 17) (arrowed line y8).

In this manner, the DLT 20 stores the dirty data among the new data written on the LLC (L3 cache 17), and the data stored in the DLT 20 is written back on the main memory 23 at the predetermined timing. Therefore, the DLT 20 may have small memory capacity. Note that the DLT 20 having the bit error rate lower than that of the LLC (L3 cache 17) is a precondition. Accordingly, when there is an error in the data readout from the LLC (L3 cache 17) and the error cannot be corrected by the L3 error detection and correction unit 19, it is possible to read out correct data from the DLT 20. Herein, even in a case where the bit error rate of the DLT data cache unit inside the DLT 20 is not lower than that of the LLC (L3 cache 17), the DLT error detection and correction unit 22 connected to the DLT 20 may preferably achieve a bit error rate lower than that of the LLC (L3 cache 17) using detecting and correcting performance. In the present description, including a case where the low bit error rate is achieved by the DLT error detection and correction unit 22, the bit error rate of the DLT 20 is defined as being lower than the bit error rate of the LLC.

The DLT 20 is provided so as to improve reliability of data when reading out the data from the L3 cache 17. Accordingly, when reading out data from the main memory 23, it is not necessary to store the data in the DLT 20. In this manner, in a strict sense, the DLT 20 is not a cache memory in the level lower than the LLC (L3 cache 17).

As mentioned above, when writing new data on the L3 cache 17, if the data is dirty data which is not stored in the main memory 23, the data will also be written on the DLT 20. Therefore, at the time of writing the data on the DLT 20, the same data also exists in the L3 cache 17. Thereafter, there may be a case where the data equal to the data written on the DLT 20 is deleted (updated) from the L3 cache 17, for example, by writing clean data on the L3 cache 17. Accordingly, right after written on the DLT 20, the data also exists in the L3 cache 17. However, there is a possibility that the data may not exist in the L3 cache 17 as time proceeds.

The abovementioned description has explained an example where the DLT 20 is provided in accordance with the L3 cache 17 when the L3 cache 17 is the LLC. However, in a case where a cache memory in a level other than the L3 cache 17 is the LLC, the DLT 20 may be provided in accordance with the LLC. Furthermore, the DLT 20 is not necessarily provided in accordance with the LLC. For example, in a case where there exists a cache memory of a higher-level than the L3 cache 17, the DLT 20 may be provided in accordance with the L3 cache 17. In other words, there may exist a cache memory of a higher-level having priority lower than that of the DLT 20. Furthermore, in a level higher than the LLC, the DLT 20 can be provided between the cache levels. In this case, the DLT 20 can be provided, for example, between the L2 cache 5 and the L3 cache 17. Furthermore, in this case, the DLT 20 can be provided between the L2 cache 5 independent per socket 2 and the L3 cache 17 shared among the sockets 2.

The DLT 20 has a characteristic of having the bit error rate lower than that of the LLC (L3 cache 17). In a case where the L3 data cache unit of the LLC (L3 cache 17) includes the MRAM, the DLT data cache unit of the DLT 20 may be configured to include a memory having a bit error rate lower than that of the MRAM (for example, SRAM, DRAM, FeRAM, or ReRAM). Furthermore, in a case where the DLT data cache unit is similarly configured to include the MRAM, a plurality of MRAM cells may be included in one cell so as to lower the bit error rate. Alternatively, writing voltage of the MRAM in the DLT data cache unit may be set higher than writing voltage of the MRAM in the L3 data cache unit so as to lower the bit error rate. Alternatively, writing pulse width of the MRAM in the DLT data cache unit may be set longer than writing pulse width of the MRAM in the L3 data cache unit so as to lower the bit error rate. Alternatively, with regard to the DLT data cache unit, by providing a verify process of the MRAM, the bit error rate may be lowered. Alternatively, readout voltage of the MRAM in the DLT data cache unit may be set lower than readout voltage of the MRAM in the L3 data cache unit so as to lower the bit error rate. Alternatively, with regard to the DLT data cache unit, by providing the DLT error detection and correction unit 22 with much stronger error correction performance, the bit error rate may be lowered.

Figure 3:
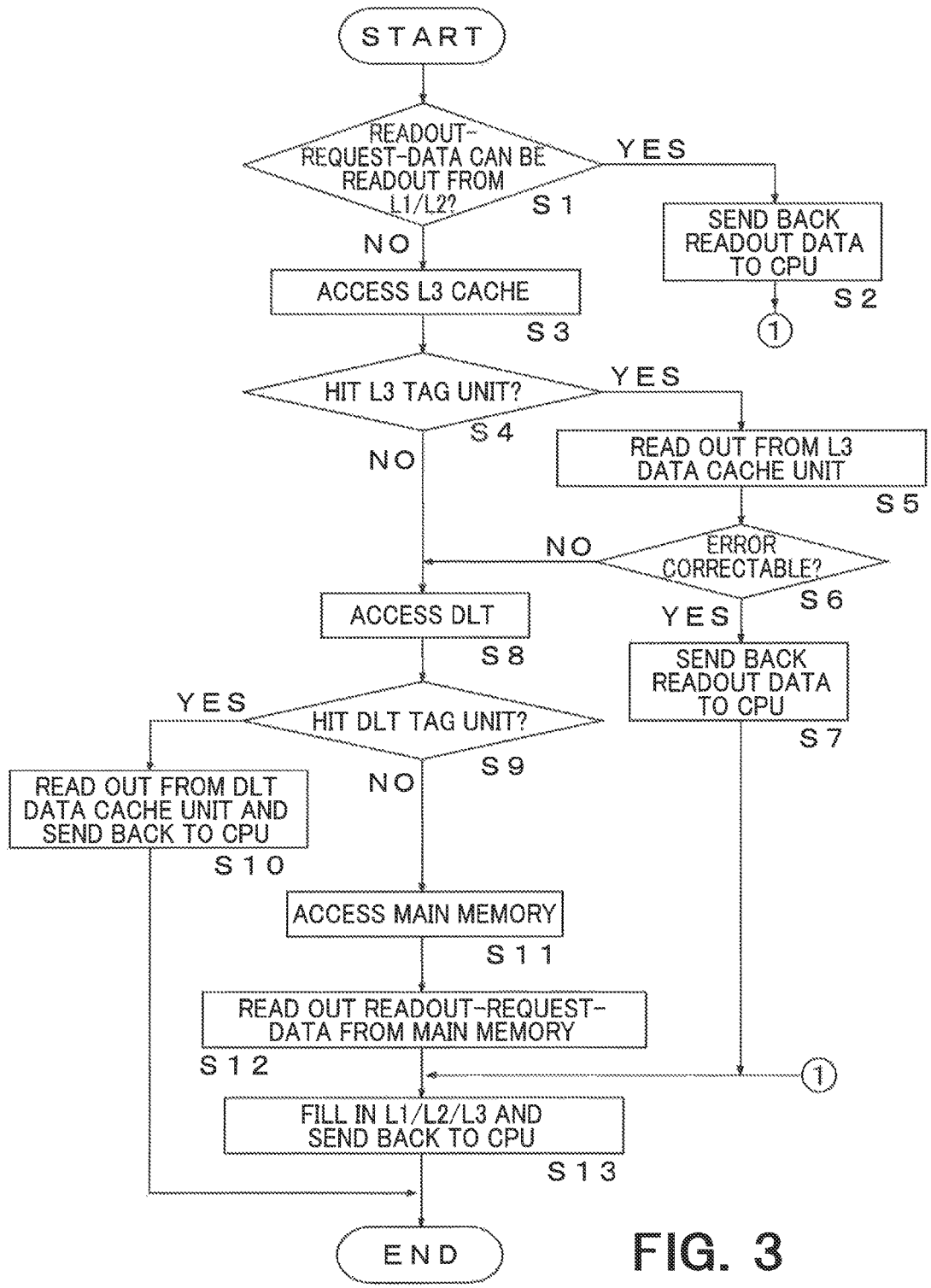
FIG. 3 is a flow chart illustrating an example of process operations of a CPU at the time of read access.

FIG. 3 is a flow chart illustrating an example of process operations of the CPU 11 at the time of read access. The flow chart in FIG. 3 illustrates the process operations in a case where the L3 cache 17 is the LLC and where the DLT 20 is provided in accordance with the L3 cache 17. As mentioned above, in a case of storing the dirty data in the L3 cache 17, the same data will be stored in the DLT 20 as well.

First, it is determined whether data to which the CPU 11 has issued readout request has been correctly read out from the L1 cache 12 or the L2 cache 5 (step S1). If the data is correctly read out, the readout data is send back to the CPU 11 (step S2).

A case where a result determined in step S1 is "NO" is when the data to which the readout request has been issued is not stored in the L1 cache 12 and the L2 cache 5. Alternatively, such a case is when the data to which the readout request has been issued is stored in the L1 cache 12 or the L2 cache 5 but the stored data has an uncorrectable error.

If the result determined in step S1 is "NO", the L3 cache 17 is accessed (step S3). Herein, address of the data to which the CPU 11 has issued the readout request is determined whether it has hit in the L3 tag unit of the L3 cache 17 (step S4, hit determination unit). If the data has hit in the L3 tag unit, the hitting data is read out from the L3 data cache unit (step S5). If there is an error in the readout data, the error is determined whether it is correctable (step S6, error correction determination unit).

If a result determined in step S6 is "YES" and the data readout from the L3 cache 17 has no error, the data is directly send back to the CPU 11. Alternatively, if the data readout from the L3 cache 17 has an error, the L3 error detection and correction unit 19 carries out the error correction on the data and then the data is send back to the CPU 11 (step S7). If the result determined in step S6 is "NO," the DLT 20 is accessed (step S8). In other words, the address of the data to which the CPU 11 has issued the readout request is determined whether it has hit in the DLT tag unit (step S9). If the address has hit in the DLT tag unit, the hitting data is read out from the DLT data cache unit (step S10). Herein, it is a precondition that reliability of the DLT data cache unit is high. Even though there is an error in the data readout from the DLT data cache unit, it is assumed that the data can be corrected by the DLT error detection and correction unit 22.

On the other hand, if the address has missed in the DLT tag unit in step S9, the main memory 23 is accessed (step S11). The data to which the CPU 11 has issued readout request is read out from the main memory 23 (step S12), and the readout data is written on (filled in) the L1 cache 12, the L2 cache 5, and the L3 cache 17 (step S13). In this case, the data readout from the main memory 23 will not be written on the DLT 20. In this manner, when reading out the data from the main memory, the data is not filled in the DLT. In this point of view, the DLT 20 is different in operation from the normal cache memory.

Figure 4:
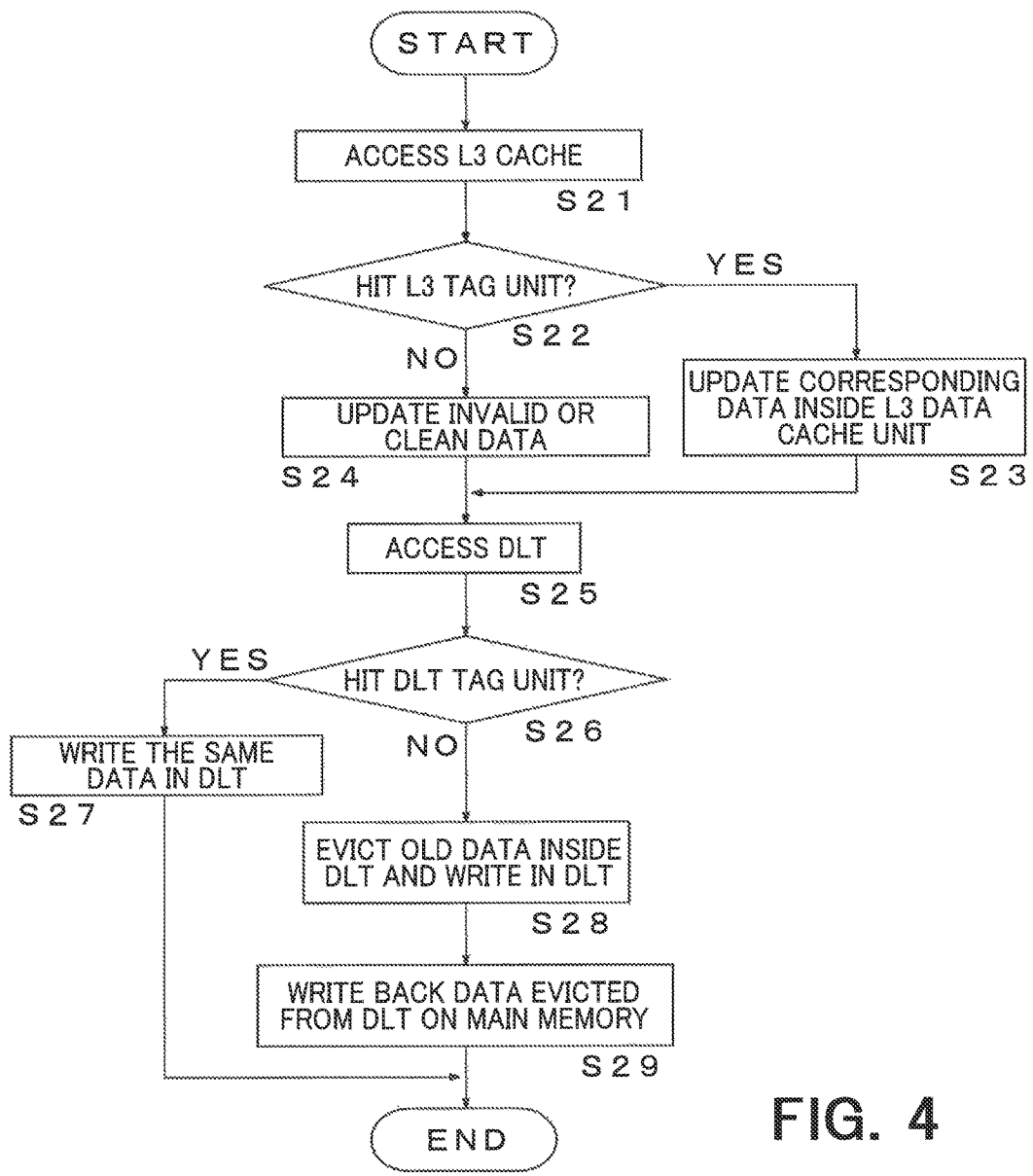
FIG. 4 is a flow chart illustrating an example of process operations in a case where data is evicted from a L2 cache due to writing request from the CPU.

FIG. 4 is a flow chart illustrating an example of process operations in a case where data is evicted from the L2 cache 5 due to writing request from the CPU 11. When data is evicted from the L2 cache 5, the L3 cache 17 is accessed (step S21). Herein, address of the data evicted from the L2 cache 5 is determined whether it has hit in the L3 tag unit (step S22). When the address has hit in the L3 tag unit, a corresponding data inside the L3 data cache unit is updated to the data evicted from the L2 cache 5 (step S23). If the address has missed in the L3 tag unit in step S22, invalid data or clean data is deleted from the L3 cache 17. In place of the deleted data, the data evicted from the L2 cache 5 is written (step S24).

After finishing the processes of step S23 or S24, next, the DLT 20 is accessed (step S25). Herein, address of the data written back on the L3 cache 17 is determined whether it has hit in the DLT tag unit (step S26). If the address has hit in the DLT tag unit, the data written back on the L3 cache 17, namely, the data evicted from the L2 cache 5 is also written on the DLT 20 (step S27). If the address has missed in the DLT tag unit in step S26, old data inside the DLT 20 is evicted. In place of the old data, the data evicted from the L2 cache 5 is written on the DLT 20 (step S28). Next, the data evicted from the DLT 20 is written back on the main memory 23 (step S29).

In this manner, in the present embodiment, the DLT 20 is provided in accordance with at least a cache memory in one-level (for example, LLC) among a plurality of stratified cache memories. The DLT 20 is a memory having the bit error rate lower than that of the LLC. The LLC includes a nonvolatile memory data region. Furthermore, when writing new dirty data on the LLC, the same data will be written on the DLT 20. As a result, even in a case where correct data cannot be read out from the LLC, the correct data can be read out from the DLT 20. Therefore, even in a case where the nonvolatile memory data region is provided to the LLC, there is no possibility of decrease in the reliability of the data. In a case where the MRAM is used for the nonvolatile memory data region, it is possible to integrate higher and access speed is faster than an NAND-type flash memory. Therefore, access performance of the LLC can be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A memory system, comprising:
  a first memory which comprises a nonvolatile memory data region;
  a second memory which stores data before storing in a third memory, the data being stored in the nonvolatile memory data region and not yet being written back on the third memory, the third memory being accessed by a processor at access priority lower than access priority of the first memory, the second memory having a bit error rate lower than a bit error rate of the first memory;
  error correction circuitry which corrects an error of data read with readout request in the nonvolatile memory data region; and
  a controller which carries out a control of reading out, from the second memory, data having an error being uncorrectable by the error correction circuitry, among the data read with the readout request.

2. The memory system according to claim 1, comprising:
  hit determination circuitry which determines whether the data to be read with the readout request is stored in the nonvolatile memory data region; and
  error correction determination circuitry which determines whether there is an error in the data determined by the hit determination circuitry as being stored and which determines whether the error is correctable by the error correction circuitry when the error is detected,
  wherein, in a case where there is no error in the data determined by the hit determination circuitry as being stored, the controller carries out a control of reading out the data from the nonvolatile memory data region,
  in a case where there is an error correctable by the error correction circuitry, in the data determined as being stored by the hit determination circuitry and readout from the nonvolatile memory data region, the controller reads out data corrected by the error correction circuitry, and
  in a case where the data is determined by the hit determination circuitry as not being stored, the controller reads out the data to which the readout request has been issued, from the third memory.

3. The memory system according to claim 1, wherein the controller carries out a control of writing data on the first memory without writing the data on the second memory when reading out the data from the third memory.

4. The memory system according to claim 1, wherein the controller writes back the data stored in the second memory on the third memory when writing new data on the second memory or when turning off a power source of the second memory.

5. The memory system according to claim 1, wherein memory capacity of the second memory is smaller than memory capacity of the first memory.

6. The memory system according to claim 1, wherein the second memory includes a nonvolatile data region or a volatile data region which has access speed faster than access speed of the first memory.

7. The memory system according to claim 1, comprising a fourth memory having access priority higher than access priority of the first memory,
  wherein the first memory is accessed in a case where the data to which readout request has been issued is not stored in the fourth memory or in a case where the data is evicted from the fourth memory due to writing request.

8. The memory system according to claim 1, wherein the first memory is a cache memory of the lowest-level, and the third memory is a main memory.

9. The memory system according to claim 1, wherein the nonvolatile memory data region includes a magnetoresistive random access memory (MRAM).

10. A processor system, comprising:
  a processor; and
  a cache memory which is accessed by the processor,
  wherein the cache memory comprises:
  a first memory which comprises a nonvolatile memory data region;
  a second memory which stores data before storing in a third memory, the data being stored in the nonvolatile memory data region and not yet being written back on the third memory, the third memory being accessed by a processor at access priority lower than access priority of the first memory,
  the second memory has a bit error rate lower than a bit error rate of the first memory,
  error correction circuitry which corrects an error of data read with readout request in the nonvolatile memory data region; and
  a controller which carries out a control of reading out, from the second memory, data having an error being uncorrectable by the error correction circuitry, among the data read with the readout request.

11. The processor system according to claim 10,
  wherein the cache memory comprises:
  hit determination circuitry which determines whether the data to be read with the readout request is stored in the nonvolatile memory data region; and
  error correction determination circuitry which determines whether there is an error in the data determined by the hit determination circuitry as being stored and which determines whether the error is correctable by the error correction circuitry when the error is detected,
  wherein, in a case where there is no error in the data determined by the hit determination circuitry as being stored, the controller carries out a control of reading out the data from the nonvolatile memory data region,
  in a case where there is an error correctable by the error correction circuitry, in the data determined as being stored by the hit determination circuitry and readout from the nonvolatile memory data region, the controller reads out data corrected by the error correction circuitry, and
  in a case where the data is determined by the hit determination circuitry as not being stored, the controller reads out the data to which the readout request has been issued, from the third memory.

12. The processor system according to claim 10, wherein the controller carries out a control of writing data on the first memory without writing the data on the second memory when reading out the data from the third memory.

13. The processor system according to claim 10, wherein the controller writes back the data stored in the second memory on the third memory when writing new data on the second memory or when turning off a power source of the second memory.

14. The processor system according to claim 10, wherein memory capacity of the second memory is smaller than memory capacity of the first memory.

15. The processor system according to claim 10, wherein the second memory includes a nonvolatile data region or a volatile data region which has access speed faster than access speed of the first memory.

16. The processor system according to claim 10,
wherein the cache memory comprises a fourth memory having access priority higher than access priority of the first memory,
wherein the first memory is accessed in a case where the data to which readout request has been issued is not stored in the fourth memory or in a case where the data is evicted from the fourth memory due to writing request.

17. The processor system according to claim 10, wherein the first memory is a cache memory of the lowest-level, and the third memory is a main memory.

18. The processor system according to claim 10, wherein the nonvolatile memory data region includes a magnetoresistive random access memory (MRAM).

* * * * *